April 25, 1950     J. C. WILLIAMS     2,505,373
PACKING GLAND
Filed April 27, 1946
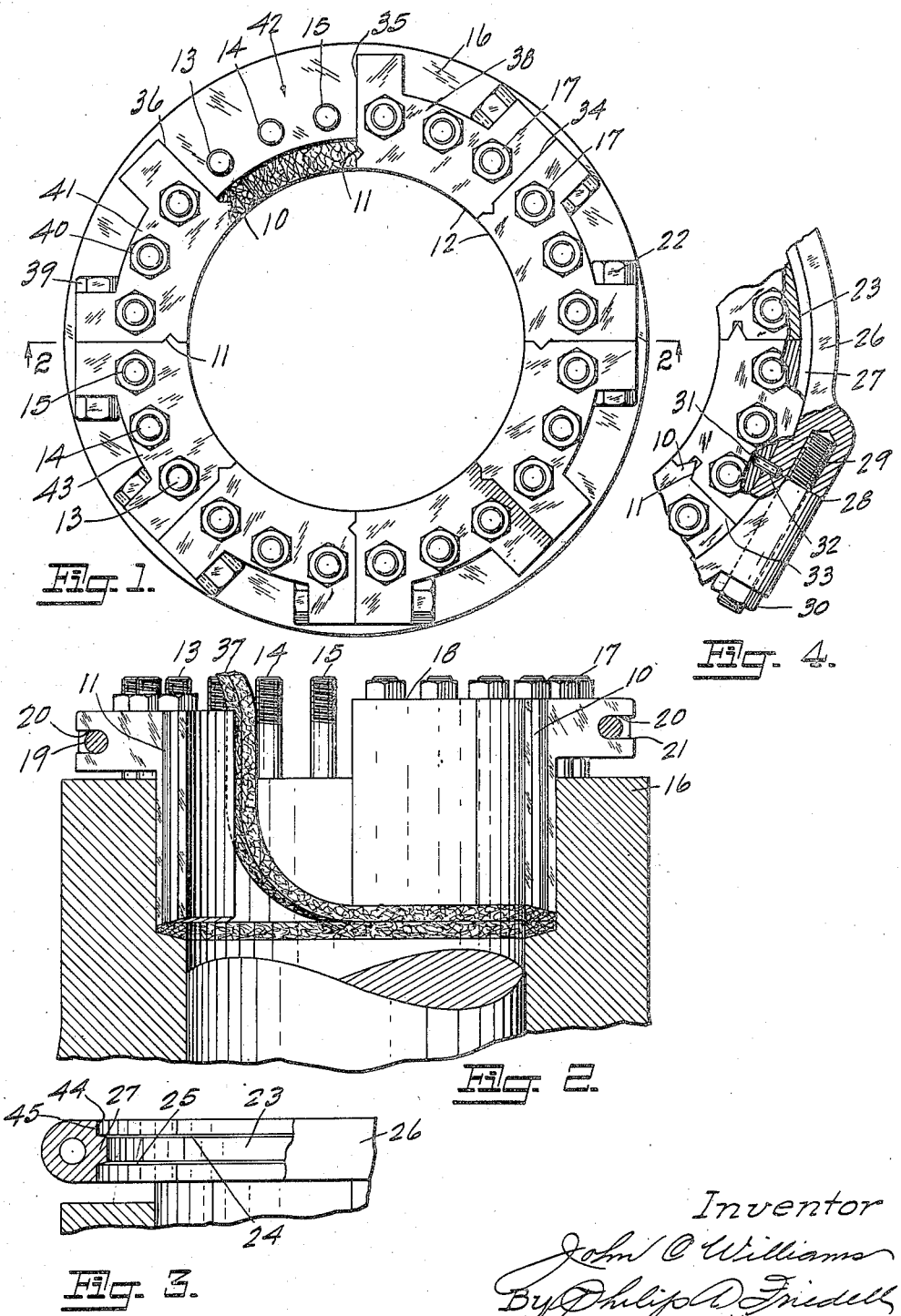

Patented Apr. 25, 1950

2,505,373

UNITED STATES PATENT OFFICE 2,505,373

PACKING GLAND

John C. Williams, Oakland, Calif.

Application April 27, 1946, Serial No. 665,567

2 Claims. (Cl. 286—33)

This invention, a packing gland, is designed principally for the stern bearings of deep-draft vessels, though not being limited to this specific type of installation. This gland is specifically desirable for all shafts of relatively large diameter such as ship's propeller shafts, and with bearings where replacement of a gland or packing would involve considerable effort or time, and particularly with pumps in which the shaft is subjected to high internal water pressures, such as surge pumps which are subjected to continuous pressure whether operating or not.

The stern bearings of ships are subjected to heads of 30 feet or more in some cases, depending on the draft of the vessel, and this head is transmitted through the clearance about the propeller shaft. To retain this head, packing glands are provided along with suitable packing. The packing has a relatively short life in comparison to that of the shaft, bearing, gland and other parts, and must be relatively frequently renewed.

The renewal of the packing is an extremely laborious and dangerous undertaking with conventional ship's propeller shaft packing glands, because when the gland is freed, the water rushes through the clearance between the bearing and the shaft, causing considerable and at other times actually serious flooding of the stern compartment before the new packing can be installed. And in installing the new packing, the problem of getting and holding the packing in a position where it can be forced to its seat by the gland is one requiring ingenuity and plenty of hard work.

With my invention the packing is quite easily renewed with no or little flooding and with a minimum of time and effort, and the several layers of packing can be installed simultaneously or sequentially. It can be used in connection with propeller shafts of any size including those having shafts twenty or more inches in diameter, and for which this invention is particularly desirable, because the extreme sizes of bearings are the ones which cause the most trouble and are most difficult to re-pack, and because in case of wear or breakage of a gland, only a small section may have to be replaced, and the gland or any part can always be replaced without disassembling any of the other associated elements or devices.

The objects and advantages of the invention are as follows:

First, to provide a packing gland for the stern bearings of vessels which permits re-packing of a bearing without undue flooding of the vessel.

Second, to provide a gland which, in the event of replacement of packing, will limit flooding to a relatively small percentage of that resulting with a conventional gland.

Third, to provide a gland which, in the event of replacement of packing, will, while limiting flooding to a relatively small percentage over conventional glands, simultaneously limit the required time and labor of replacement to approximately a similar degree.

Fourth, to provide a gland as outlined which is formed of a plurality of easily-replaceable and alignable sectors, any of which sectors can be removed and replaced at will without affecting the adjustment of the rest of the gland.

Fifth, to provide a gland as outlined which is formed of a plurality of easily-replaceable and alignable sectors so that packing can be inserted step by step while maintaining the adjustment of the major portion of the gland.

Sixth, to provide a packing gland consisting of a plurality of sectors mutually concentrically alignable and individually securable, adjustable, removable, and replaceable and having means for transversely aligning and securing the sectors together at will.

Seventh, to provide a packing gland consisting of a multiplicity of sectors mutually concentrically alignable and separately removable, replaceable and securable so that new packing can be installed by sequentially removing the sectors with no more than two sectors removed at any one time, so as to retain a seal against ingress of fluid about a shaft throughout the major portion of the circumference of the shaft and limit such ingress to the portion of the circumference included in one or two sectors.

In describing the invention reference will be made to the accompanying drawing, in which:

Fig. 1 is an end elevation of the invention, with one sector removed and new packing being installed.

Fig. 2 is a section taken on line 2—2 of Fig. 1.

Fig. 3 is a fragmentary sectional view showing a modification of the transverse or facial aligning means and securing means.

Fig. 4 is a fragmentary end view of a modification of the invention and showing a modification of the concentric aligning means, and one of the securing means for the transverse aligning means illustrated in Fig. 3.

Although the gland is illustrated as formed in only eight sectors, this number may be increased to any number which is best suited to the specific type of installation. With shafts twenty or more inches in diameter, twelve or more sectors would be more suitable; twelve sectors reducing the flow of water to respectively one-sixth and one-twelfth as sectors are removed and replaced and the packing inserted, in comparison to unrestricted full flow with solid or two-sector glands, for which reason a gland formed in two sections or split in halves has no advantage over a single piece gland, and a three sector gland has very little advantage since the leakage would vary from one-third to two-thirds of total volume during installation of the packing. The greater the number of divisions the less the leakage, though the number is restricted to circumferential lengths which will permit separately securing the sectors.

As illustrated in Figs. 1 and 2, each sector has suitable concentric aligning means, illustrated as consisting of a V-shaped key member 10 formed in one dividing face and a V-shaped slot 11 formed in the other face, so that the various sections can readily be slid or forced into place with the keys and slots maintaining perfect alignment of the inner periphery or bore 12 of the assembled sectors.

Each sector has its individual securing means and shown as consisting of three studs 13, 14 and 15 which are fixed in the bearing block or head 16, with nuts 17 providing for axial adjustment of the sector.

Suitable transverse or facial aligning means and securing means for securing the sectors together and bringing the faces 18 of the sectors in alignment is illustrated in Figs. 1 and 2 as consisting of dowel-type bolts 19 which, in the event of ample room for removal may be mounted in reamed holes (not shown) but preferably in accurately-machined slots 20 which permits alignment of the sectors before insertion of the dowels through registry of the edges 21 of the slots, thus facilitating insertion of the dowels.

When the edges are aligned and a dowel inserted, the nut 22 is drawn up tight, assuring accurate alignment and positive securing of the sectors; the inner periphery or bore is concentrically aligned by the key 10 in cooperation with the slot 11, and the face 18 is aligned by the accurately fitting dowel 19.

Preliminary alignment of the face is initially effected through adjustment of the nuts 17 on the studs 13, 14, 15, with the studs simultaneously functioning as locating means.

The modification shown in Fig. 3 provides a very desirable type of facial aligning means, since alignment is readily observable and detectable, but having a slight disadvantage over the system previously described in that when released, all sectors are freed for facial misalignment, and for spreading, which may make removal and replacement of sectors a little more difficult, though having other advantages offsetting any slight disadvantages of the type just mentioned.

This modification consists in forming an annular keyway 23 around the clamp collar when all sectors are accurately assembled, and preferably forming the keyway with outwardly diverging faces 24 and 25, and providing a clamp collar 26 with a key 27 formed internally to fit the keyway, and splitting the clamp collar at one or more points as indicated at 28 and providing clamping means such as a stud 29 and nut 30 where there are two or more sections of the clamp, a bolt or cap screw being necessary if the ring is split at only one point. Suitable locating means to assure keying of all joints is indicated as consisting of a pin 31 fixed in one of the sectors and fitting in a recess 32 formed at one joint of the clamp so that the joint 28 cannot coincide with a joint 33 between the sectors.

To replace packing or insert additional packing, with the arrangement shown in Figs. 1 and 2, the bolts 19 are removed from three joints, such as at 34, 35 and 36 and the two intervening sectors are drawn out of their sockets. One terminal end of the packing is bent down in the socket with the remainder projecting as indicated at 37. The first sector 38 is then slid back into place, the nuts 17 applied and tightened just enough to secure and slightly compress the end of the packing.

The bolt 39 and nuts 40 are then removed, and the sector 41 is then drawn out of its socket and the sector for the space 42 is then replaced, and the nuts drawn down until the edges 21 at the joint are in alignment. The bolt 19 is then inserted and tightened (if no more layers of packing are to be inserted), aligning the faces of the two sectors and clamping them together.

This is followed by removal of the next sector 43 and replacement of sector 41, continuing around until all sectors have been removed, the packing laid and the last sector replaced and facially aligned, after which the entire unit is adjusted by means of the nuts 17 to produce the proper compression of the packing.

If several layers of packing are to be installed, the first layer is started under one sector, the second under a second or third, and so on, omitting replacement of the aligning members 19 until two adjacent sectors are working on the same number of plies of packing. This involves part of a second circuit, a distance equal to the number of sectors between the joints of the first and last layers of packing, for completing the packing.

With the aligning and clamping means illustrated in Figs. 3 and 4, the clamp 26 is removed, after which the sectors are removed and replaced as the packing is introduced in the same way as that described for Figs. 1 and 2, except that there are no aligning and clamping bolts to remove and replace.

Instead, after the packing is all in place and the sectors have all been replaced and the nuts 17 screwed part way, the sectors are adjusted in sequence by means of the nuts 17 to align the keyway 23 at the joints, after which the clamp 26 is placed in position and drawn up by means of the nut 30. If there is any misalignment, the key 27 will tend to align the sectors and will immediately indicate any misalignment through lack of contact between the inside face 44 of the ring and the outside face 45 of the gland collar. When misalignment is indicated, it is merely necessary to slightly adjust one or the other of the nuts 17 adjacent to the joint where the misalignment exists. When alignment is completed, the nut 30 is drawn tight, clamping the sectors into a unit, after which axial adjustment of the unit can be carried out to produce the proper compression on the packing to make the bearing leak-proof.

I claim:

1. A packing gland for the propeller shaft of a deep-draft ship or the like comprising a series of not less than four sectors to form when assembled, a complete packing gland exteriorly cylindrical to slidably fit in an axial bore, and interiorly cylindrical to rotatably receive the shaft, with the contact faces of the sectors keyed for relative axial movement and against relative radial movement for cylindrical alignment of the exterior and interior of the packing gland; each of said sectors having an outwardly projecting flange provided with a plurality of stud passages and studs therefor for individual axial alignment; and combined aligning, keying, and securing means cooperative between the flanges for aligning the faces of the sectors and securing the sectors into a complete gland, whereby continuous packing is replaceable at will through removal of not more than two sectors at any one time to reduce inrush of water of submergence by not less than 50% as related to two-sector glands, in which said flanges upon assembly of said sectors form a continuous cylindrical flange; said combined aligning, keying and securing means comprising an annular groove having divergent walls and formed in the peripheral surface of said continuous cylindrical flange, and a pair of half-rings having inwardly convergent sides to fit in said groove, and means for securing the ends of the half-rings together to form a continuous ring to align, key and secure the sectors into the said unit.

2. A structure as defined in claim 1 in which said continuous ring is keyed at its joints to the sectors, at points removed from the joints between the contacting faces of the sectors, to assure positive keying and alignment of the faces of the sectors to align the packing and face ends of the assembled gland.

JOHN C. WILLIAMS.

REFERENCES CITED

The following references are of record in the file of this patent:

UNITED STATES PATENTS

| Number | Name | Date |
|---|---|---|
| 805,308 | Maloy et al. | Nov. 21, 1905 |
| 1,181,535 | Moyle | May 2, 1916 |
| 1,605,809 | Cole | Nov. 2, 1926 |
| 1,913,030 | Hux | June 6, 1933 |
| 2,130,741 | McClain | Sept. 20, 1938 |